United States Patent

Miyazaki et al.

[11] Patent Number: 5,936,703
[45] Date of Patent: Aug. 10, 1999

[54] ALKOXYSILANE COMPOUND, SURFACE PROCESSING SOLUTION AND CONTACT LENS

[75] Inventors: Tuyoshi Miyazaki; Yasumi Koinuma, both of Tsukuba, Japan

[73] Assignee: NOF Corporation, Tokyo, Japan

[21] Appl. No.: 08/980,988

[22] Filed: Dec. 1, 1997

Related U.S. Application Data

[62] Continuation of application No. 08/710,048, Sep. 10, 1996, abandoned, which is a continuation of application No. 08/481,268, filed as application No. PCT/JP94/01712, Oct. 13, 1994.

[30] Foreign Application Priority Data

Oct. 13, 1993 [JP] Japan .................................. 5-256070

[51] Int. Cl.$^6$ ...................................................... G02C 7/04
[52] U.S. Cl. ................................ 351/160 R; 351/160 H; 106/287.11; 556/425; 556/413; 528/38; 528/23; 528/12; 523/107
[58] Field of Search .......................... 351/160 R, 160 H; 106/287.11; 556/425, 413; 528/38, 23, 12; 523/107

[56] References Cited

U.S. PATENT DOCUMENTS

| | | | |
|---|---|---|---|
| 4,472,327 | 9/1984 | Neefe | 264/1.9 |
| 5,064,613 | 11/1991 | Higgs et al. | 422/16 |
| 5,311,223 | 5/1994 | Vanderlaan | 351/160 H |
| 5,418,295 | 5/1995 | Bowers et al. | 525/379 |
| 5,765,579 | 6/1998 | Heiler et al. | 134/42 |

FOREIGN PATENT DOCUMENTS 5-222064 8/1993 Japan .

*Primary Examiner*—Margaret Moore
*Attorney, Agent, or Firm*—Darby & Darby

[57] ABSTRACT

An alkoxysilane compound represented by the formula (I)

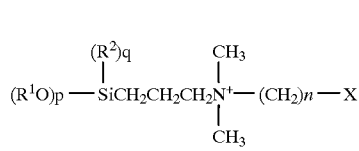

(I)

wherein $R^1$, and $R^2$ denote —$CH_3$ or —$C_2H_5$ and X denotes —$COO^-$ or —$SO_3^-$, p and n denote an integer of 1 to 3 and q denotes 0 or 1, where p+q=3, a surface processing solution containing the alkoxysilane compound or its acid-processed reaction product and a contact lens surface-processed with the surface processing solution. The alkoxysilane compound is capable of affording hydrophilicity to the surfaces of various substrates and may be utilized in the field of fibers, optical components, medical materials or in inspection and diagnostic drugs, particularly as a surface bound coating composition for contact lenses.

7 Claims, No Drawings

ALKOXYSILANE COMPOUND, SURFACE PROCESSING SOLUTION AND CONTACT LENS

This is a continuation of application Ser. No. 08/710,048, now abandoned filed Sep. 10, 1996, which is a continuation of application Ser. No. 08/481,268, filed Jun. 7, 1995, now abandoned, which is the U.S. national phase of International Application No. PCT/JP94/01712, filed Oct. 13, 1994. The most recent of these prior applications is hereby incorporated herein by reference, in its entirety.

TECHNICAL FIELD

This invention relates to an alkoxysilane compound which is excellent in rendering the surface of a variety of inorganic or organic materials to become hydrophilic and which is useful as anti-clouding agents, anti-static agents, dyeing promotors, protein adsorption controlling agents, cell adhesion controlling agents or as anti-thrombotics in the field of fibers, optical components, medical materials or inspection and diagnostic drugs. The invention also relates to a surface processing solution which contains the alkoxysilane compounds and/or acid-processing reaction products thereof and which is capable of improving surface hydrophilicity of a variety of materials and affording wearing agreeability, contamination proofing properties and detachment preventative properties of a contact lens, and a contact lens having its surface processed with the surface processing solution.

BACKGROUND ART

The silane coupling agents containing alkoxysilane groups have the functions of affording hydrophobic properties to the surface of the inorganic or organic materials and readily introducing reactive groups into these materials, and hence have been employed as a surface modifier. However, there have up to now been unknown alkoxysilane compounds which afford hydrophilic properties.

On the other hand, there has been known betaine as a compound exhibiting superior hydrophilicity. For example, it is disclosed in U.S. Pat. No. 3,671,502 that a copolymer of N-methacryloyloxyethyl-N,N-dimethyl-N-(3-sulfopropyl) ammonium betaine and 2-hydroxyethyl methacrylate exhibits higher hydrophilicity than poly (2-hydroxyethyl methacrylate) known as a hydrophilic high molecular material. However, these compounds do not contain, alkoxysilane groups and betaine groups simultaneously.

There is also described in Japanese Patent Kohyo No.61-500918 a method for introducing a phosphatidyl choline group onto the surface of a hydroxyl group-containing substance for providing a compound to improve biocompatible surface. Although the phosphatidyl choline group is capable of exhibiting superior hydrophilicity, it is inferior in resitance against hydrolysis and in long-term stability.

Among the currently employed contact lenses, there are a hard contact lens produced by polymerizing mainly a monomer such as methyl methacrylate, a semi-hard contact lens produced by polymerizing mainly a monomer such as butyl methacrylate, and a soft contact lens produced by polymerizing mainly a hydrophilic monomer such as 2-hydroxyethyl methacrylate. Of these, the hard contact lens is free of water content and hence superior in hygienic properties. However, it is insufficient in oxygen permeability required for providing satisfactory cornea metabolism to permit continuous wearing. Although the semi-hard contact lens exhibits pliability to some extent and hence is superior in wearing properties, it is poor in oxygen permeability and shape stability. On the other hand, the soft contact lens has water content therein and hence is superior to the hard or semi-hard contact lens in wearing properties. However, it is hygienically unsatisfactory and presents maintenance problems, such as necessity of daily boiling for sterilization.

For eliminating the above-described inconvenience of the prior art contact lenses, high oxygen permeable hard contact lens is recently becoming more popular in the contact lens market. This type of contact lens is mainly formed of silicone-based polymers, such as polysiloxane or silicon-containing methacrylate polymer, and is relatively satisfactory in safety to living bodies. However, the silicone-based polymer by itself is low in strength and has a problem in workability, so that it becomes necessary to increase the lens thickness or to employ reinforcing materials.

Various proposals have been made for improving strength of the silicone-based polymer. For example, in Japanese Patent Publications Nos.62-8762 and 63-36646 a copolymer mainly containing silicon-containing methacrylate and fluorine-containing methacrylate is proposed. On the other hand, in U.S. Pat. Nos. 3,419,634 and 3,419,635 a silicone-polycarbonate copolymer is proposed. However, the copolymers having high oxygen permeability are inferior in wearing properties and wearing agreeability, although the copolymers exhibit acceptable high strength.

It is an object of the present invention to provide a novel alkoxysilane compound which contains both the alkoxysilane group and the betaine group, which is capable of affording hydrophilicity to various materials and which gives superior resistance against hydrolysis after affording hydrophilicity.

It is another object of the present invention to provide a surface processing solution which is capable of improving hydrophilicity of the surfaces of various materials and particularly the wearing properties and wearing agreeability of the contact lens and which is capable of affording contamination proofness and detachment preventative properties of the contact lens.

It is a further object of the present invention to provide a surface processing solution capable of affording a surface processed layer superior in anti-hydrolytic properties.

It is yet another object of the present invention to provide a contact lens which is superior in wearing properties and wearing agreeability and exhibits contamination proofness and detachment preventative properties.

DISCLOSURE OF THE INVENTION

According to the present invention, there is provided an alkoxysilane compound represented by the formula (I)

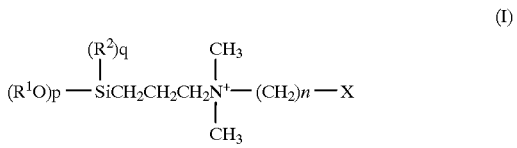

(I)

wherein $R^1$ and $R^2$ stand for a methyl group or an ethyl group, X is —COO⁻ or —$SO_3^-$, p and n are integers of 1 to 3 and q is 0 or 1, where p+q=3.

According to the present invention, there is also provided a surface processing solution secured on a surface of a substrate for modifying the substrate surface. The surface processing solution contains the alkoxysilane compound represented by the above formula (I) and/or an acid-processed reaction product thereof.

According to the present invention, there is also provided a contact lens surface-processed with the above surface processing solution.

BEST MODE FOR CARRYING OUT THE INVENTION

The present invention will be explained in detail hereinbelow.

The alkoxysilane compound of the present invention is an alkoxysilane compound represented by the aforementioned formula (I), and may specifically be exemplified by N-propyl trimethoxysilane-N,N-dimethyl-N-(3-sulfopropyl) ammonium betaine, N-propyl trimethoxysilane-N,N-dimethyl-N-(2-carboxyethyl) ammonium betaine, N-propyl diethoxy methylsilane-N,N-dimethyl-N-(3-sulfopropyl) ammonium betaine, N-propyl diethoxy methylsilane-N,N-dimethyl-N-(2-carboxyethyl) ammonium betaine, N-propyl trimethoxysilane-N,N-dimethyl-N-(1-sulfomethyl) ammonium betaine, N-propyl diethoxy methylsilane-N,N-dimethyl-N-(1-sulfomethyl) ammonium betaine, N-propyl diethoxy methylsilane-N,N-dimethyl-N-(2-sulfoethyl) ammonium betaine, N-propyl diethoxy methylsilane-N,N-dimethyl-(2-sulfoethyl) ammonium betaine and N-propyl diethoxy methylsilane-N,N-dimethyl-N-(carboxymethyl) ammonium betaine.

The above-mentioned alkoxysilane compounds may be readily prepared by a method of reacting a dimethylamino group-containing alkoxysilane compound with a sultone ring compound, a lactone ring compound or a monohalogenated-alkyl carboxylic acid, or a method of adding acrylonitrile to the above-mentioned dimethyl amino group-containing alkoxysilane compound and oxidizing the resulting addition product.

The dimethylamino group-containing alkoxysilane compound may preferably be enumerated by N,N-dimethyl-3-aminopropyl trimethoxysilane, N,N-dimethyl-3-aminopropyl methyl diethoxysilane, N,N-dimethyl-3-aminopropyl methyl methoxysilane and N,N-dimethyl-3-aminopropyl triethoxysilane.

The sultone ring compound may be exemplified by propane sultone and 1,4-butane sultone.

The lactone ring compound may be exemplified by β-propyl lactone and β-butyrolactone.

The monohalogenated carboxylic acid may be exemplified by monochloroacetic acid and β-chloropropionic acid.

In carrying out the above reaction, the charging molar ratio of the dimethyl amino group-containing, alkoxysilane compound to the sultone ring compound, the lactone ring compound or the monohalogenated carboxylic acid or the charging molar ratio of the dimethyl amino group-containing alkoxysilane compound to acrylonitrile is preferably 1:0.5 to 10 and more preferably 1:0.8 to 1.2.

The above-mentioned reaction is preferably carried out in the presence of an organic solvent such as dried acetonitrile, methanol, ethanol, chloroform or diethylether at a reaction temperature of −100° C. to 120° C. for 30 minutes to 100 hours.

If the resulting reaction product is precipitated in the above-mentioned organic solvent, the high purity alkoxysilane compound may be produced by filtration followed by drying. If the reaction is carried out throughout in a homogeneous reaction system, the resulting reaction product may be directly employed. However, the reaction product may be further re-crystallized, re-precipitated, processed with an adsorbent or in a column or distilled for isolation and purification in a known manner.

The alkoxysilane compound of the present invention is a novel compound containing an alkoxysilane group and a betaine group in a molecule and exhibiting superior hydrophilicity, so that the compound may be employed as surface modifying agents, such as anti-clouding agents, anti-static agents, dyeing promoters, protein adsorption controlling agents, or as cell adhesion controlling agents.

The surface processing solution of the present invention contains the alkoxysilane compound represented by the formula (I) and/or acid-processed reaction product thereof as an essential ingredient(s). The alkoxysilane compounds may preferably be exemplified by the above-enumerated compounds. The acid-processed reaction products of the alkoxysilane compounds may be exemplified by the above-mentioned alkoxysilane compounds, a part or all of the alkoxysilane groups of which have been converted into silanol groups of high activity or low condensate products thereof. The acid-processed reaction product may be produced by adding and mixing acids, such as acetic acid, hydrochloric acid or sulfuric acid, to a surface processing solution containing the aforementioned alkoxysilane compound. The amount of addition of the acid may be a desired amount capable of converting the alkoxysilane groups into the silanol groups, but is preferably 0.01 to 10 wt % based on the total quantity of the surface processing solution.

In addition to the above-mentioned essential components, surfactants, such as anionic surfactants, e.g. sodium dodecyl benzenesulfonate or sodium dodecylsulfonate; cationic surfactants, e.g. cetyl pyridium chloride; or non-ionic surfactants, e.g. polyethylene glycol stearylether, may be contained in the surface processing solution of the present invention. The proportion, of the surfactant is preferably not more than 1 mol to 1 mol of the alkoxysilane compound and/or the acid-processed reaction product thereof.

The surface processing solution of the present invention may be prepared by diluting the material containing the above-mentioned essential components in an organic solvent, such as ethanol, methanol, dimethylformamide, dimethyl sulfoxide, tetrahydrofuran or 1,4-dioxane, water, or mixtures thereof. Although there is no particular limitation to the concentration of the alkoxysilane compound and/or the acid-processed reaction product thereof in the surface processing solution, the concentration is preferably 0.01 to 80 wt % and more preferably 0.01 to 50 wt %. If the concentration is less than 0.01 wt %, sufficient hydrophilicity cannot be achieved, whereas, if the concentration is higher than 80 wt %, and if a substrate is a contact lens, the basic desirable properties of the contact lens, such as oxygen permeability or mechanical strength, tend to be lost, thus being not preferred.

The substrate to which the surface processing solution according to the present invention may be secured for surface processing may be enumerated by a substrate material containing a silanol group, a hydroxyl group or a carboxyl group, or a substrate having numerous fine irregularities on its surface, that is inorganic high molecular materials, such as glass or ceramics; resins obtained by processing the surface of organic high molecular materials by plasma discharge such as polypropylene, polyethylene, polyethylene terephthalate, polystyrene, polyvinyl chloride or Teflon; and cellulose. The substrate may be exemplified by a contact lens, such as an oxygen-permeable hard contact lens or soft contact lens, and a film for blood dialysis. The substrate may be efficiently surface-modified irrespective of its shape, such as a spherical, lenticular, film-like, tubular, pouch-like or fibrous shape. If the substrate is a contact lens, it may be enumerated by a contact lens, at least the lens surface material of which is formed of a material containing functional groups capable of being condensed with alkoxylsilane or silanol groups. Specific examples of these contact lenses include those formed of resins containing silicon units, such as tris(trimethylsiloxy) silane groups, resins having hydroxyl groups, such as 2-hydroxy methacrylate, resins having carboxyl groups, such as methacrylic acid, or resins containing a mixture of these groups. For fixedly depositing the surface processing solution on the substrate, a method of utilizing the silane coupling reaction as later explained may be employed.

It is possible with the surface processing solution of the present invention to improve hydrophilicity of the surfaces of a variety of substrates, such as a contact lens. If the substrate is a contact lens, its wearing properties and wearing agreeability may be improved and such functions as contamination proofing properties and detachment preventative properties may be afforded to the lens. In addition, the resulting processed surface layer is superior in resistance against hydrolysis. These superior effects may be produced in stability for a prolonged time.

The contact lens according to the present invention is obtained by surface-processing a contact lens surface with the above-mentioned surface processing solution. Although there is no particular limitation to the contact lens as the substrate, the above-enumerated contact lenses may preferably be exemplified.

It suffices if the surface processing is carried out so that the surface processing solution is fixedly deposited on the contact lens surface. Specifically, the surface processing may be carried out by immersing the contact lens in the surface processing solution or coating the contact lens with the surface processing solution by spraying or brushing, and by subsequently carrying out the silane coupling reaction. The silane coupling reaction is preferably carried out at a temperature of 0° to 250° C., more preferably at a temperature of 20° to 140° C., for 30 minutes to 1000 hours, more preferably for 1 to 24 hours. The contact lens prior to the above reaction and after the coating thereon of the surface processing solution,is air-dried for 30 minutes to 24 hours at room temperature. After the reaction, the contact lens is preferably washed with distilled water and the like. Prior to surface processing, the contact lens is preferably pre-processed, such as by washing with a surfactant or an organic solvent, such as acetone, methanol or ethanol, followed by acid processing, alkali processing or plasma processing in a known manner.

By such surface processing, a contact lens is produced on the surface of which a surface coating layer formed of the above-mentioned hydrophilic alkoxysilane compound and/or the acid-processed reaction product thereof is formed. The surface coating layer is preferably of a thickness of 0.001 to 1000 μm.

The contact lens of the present invention having its surface treated with the surface processing solution, exhibits the superior properties and functions proper to the surface processing solution in stability for a prolonged time.

EXAMPLES

The present invention is explained in greater detail with reference to Examples and Comparative Examples. The present invention, however, is not limited by these merely illustrative Examples or Comparative Examples.

Example 1

In a three-necked flask fitted with a stirrer and a nitrogen-inlet tube were charged 100 ml of dried acetonitrile, 2.00 g (9.6 mmol) of N,N-dimethyl-3-aminopropyl trimethoxysilane and 1.17 g (9.6 mmol) of propane sultone and reaction was carried out at room temperature for 24 hours. After the end of the reaction, the resulting reaction mixture was concentrated under reduced pressure to give N-propyl trimethoxysilane-N,N-dimethyl-N-(3-sulfopropyl) ammonium betaine represented by the following formula:

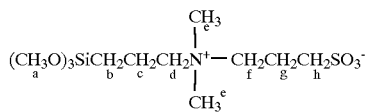

with a yield of 99.8%. The results of analyses by $^1$H-NMR spectrum, elementary analysis and infrared absorption spectrum were as follows:

$^1$H-NMR (D$_2$O, δ: ppm, 270 MHz) spectrum; 3.55 (a, s, 9H), 3,43 (f, m, 2H), 3.31 (d, m, 2H), 3.06 (e, s, 6H), 2.95 (h, t, 2H, J=7.25), 2.22 (g, m, 2H), 1.81 (c, m, 2H), 0.70 (b, t, 2H, J=8.41)

Elementary Analysis (H$_{27}$C$_{11}$NO$_6$SSi) Calculated: H, 8.27; C, 40.11; N, 4.25 Found: H, 8.38; C, 39,98; N, 4.17

IR Absorption Spectrum (KBr:cm$^{-1}$) 3400, 1200 (SO$_3$), 1040 (Si—O—CH$_3$)

Example 2

The reaction was carried out in the same manner as in Example 1, except employing β-propiolactone in place of propane sultone, to give N-propyl trimethoxysilane-N,N-dimethyl-N-(2-carboxyethyl) ammonium betaine represented by the following formula:

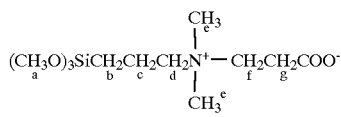

with a yield of 99.4%. The results of analyses were as follows:

$^1$H-NMR (D$_2$O, δ: ppm, 270 MHz) spectrum; 3.57 (a, s, 9H), 3.56 (f, t, 2H, J=7.75), 3.07 (e, s, 6H), 3.38 (d, t, 2H, J=6.6), 2.65 (g, t, 2H, J=7.60), 1.81 (c, m, 2H), 0.71 (b, t, 2H, J=8.41)

Elementary Analysis (H$_{25}$C$_{11}$NO$_5$Si) Calculated: H, 9.03; C, 47.29; N, 5.02 Found: H, 9.11; C, 47.31; N, 5.08

IR Absorption Spectrum (KBr:cm$^{-1}$) 2900, 1590(COO$^-$), 1040(Si—O—CH$_3$)

Example 3

The reaction was carried out in the same manner as in Example 1, except employing N,N-dimethyl-3-aminopropyl methyl diethoxysilane in place of N,N-dimethyl-3-aminopropyl trimethoxysilane, to give N-propyl diethoxy methylsilane-N,N-dimethyl-N-(3-sulfopropyl) ammonium betaine represented by the following formula:

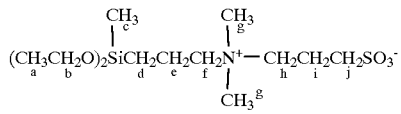

with a yield of 99.8%. The results of analyses were as follows:

$^1$H-NMR (D$_2$O, δ: ppm, 270 MHz) spectrum; 3.84 (b, q, 4H, J=6.93), 3.45 (h, m, 2H), 3.32 (f, m, 2H), 3.09 (g, s, 6H), 2.97 (j, t, 2H, J=7.25), 2.21 (i, m, 2H), 1.81 (e, m, 2H), 1.19 (a, t, 6H, J=6.93), 0.71 (d, t, 2H, J=8.41), 0.25 (c, s, 3H)

Elementary Analysis (H$_{31}$C$_{13}$NO$_5$SSi) Calculated: H, 9.16; C, 45.73; N, 4.10 Found: H, 9.20; C, 45.69; N, 4.06

IR Absorption Spectrum (KBr:cm$^{-1}$) 3400, 1196 (SO$_3$) 1260 (Si—CH$_3$), 1044 (Si—O—C$_2$H$_5$)

Example 4

The reaction was carried out in the same manner as in Example 1, except employing N,N-dimethyl-3-aminopropyl methyl diethoxysilane in place of N,N-dimethyl-3-aminopropyl trimethoxysilane and employing β-propiolactone in place of propane sultone, to give N-propyl diethoxy methylsilane-N,N-dimethyl-N-(2-carboxyethyl) ammonium betaine represented by the following formula:

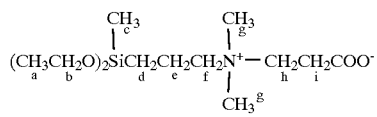

with a yield of 99.4%. The results of analyses were as follows:

$^1$H-NMR (D$_2$O, δ: ppm, 270 MHz) spectrum; 3.84 (b, q, 4H, J=6.93), 3.55 (h, t, 2H, J=7.76), 3.38 (f, t, 2H, J=6.6), 3.07 (g, s, 6H), 0.25 (c, s, 3H), 2.65 (i, t, 2H, J=7.59), 1.81 (e, m, 2H), 1.19 (a, t, 6H, J=6.93), 0.71 (d, t, 2H, J=8.41)

Elementary Analysis (H$_{29}$C$_{13}$NO$_4$Si); Calculated: H, 10.04; C, 53.57; N, 4.81 Found: H, 10.10; C, 53.51; N, 4.88

IR Absorption Spectrum (KBr:cm$^{-1}$) 2900, 1590 (COO$^-$), 1260 (Si—CH$_3$), 1044 (Si—O—C$_2$H$_5$)

Reference Example

10%-solutions in ethanol of respective alkoxysilane compounds obtained by the Examples 1 to 4 were coated on glass plates and dried at room temperature. The resulting glass plates were heated at 120° C. for one hour to produce glass plates surface-processed with the alkoxysilane compounds. The contact angles of the produced glass plates were measured by a water drop method. It was found that the contact angle (2θ) of the surfaces of the glass plates before processing was 89°, while the contact angle of each of the processed glass plates was approximately 10°, thus indicating that superior hydrophilic surfaces have been produced.

The glass plates surface-processed with the alkoxysilane compounds obtained by Example 3 were checked as to the possible presence of nitrogen atoms on the plate surface using an X-ray photoelectron spectrometer, manufactured by SHIMADZU CORP. under the trade name of ESCA K-I. The surface-processed glass plates were also immersed for 24 hours in 1N-hydrochloric acid and subsequently washed with distilled water to check for possible presence of nitrogen atoms in a similar manner.

It was found that there was no change before and after processing with hydrochloric acid in the peak due to the quaternary amine in the sulfobetaine group in the N1s bound energy region (402.5 eV), and hence an excellent resistance against hydrolysis has now been achieved.

For comparison, a phosphatidyl choline derivative was synthesized by the method hereinafter explained and, using this derivative, the glass plate was surface-processed in a similar manner for evaluating its hydrophilicity and resistance against hydrolysis.

Synthesis of Phosphatidyl Choline 22.7 g of ethylene glycol phosphatidyl choline was stirred sufficiently and introduced dropwise into 129 g of chloromethylsilane. The resulting mixed solution was stirred for one hour while being cooled to approximately 20° C. The resulting solution was concentrated under reduced pressure to synthesize a derivative represented by the following formula:

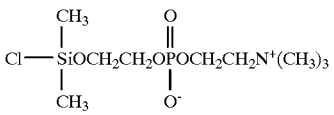

It was found as a result of evaluation that the contact angle after surface processing was approximately 10°, such that the surface-processed glass plate exhibited superior hydrophilicity comparable to that of the Examples. On the other hand, the peak due to the quaternary amine in the phosphatidyl choline group in the N1s bound energy region (400.5 eV), which was noticed prior to treatment with hydrochloric acid, was no longer noticed after treatment with hydrochloric acid. Thus it has been found that the surface of the glass plate processed with the phosphatidyl choline derivative is inferior in resistance against hydrolysis, although it is superior in hydrophilicity.

Example 5

50 parts by weight of tris(trimethyl siloxy) silylpropyl methacrylate, 40 parts by weight of methyl methacrylate, 10 parts by weight of ethylene glycol dimethacrylate and 0.1 part by weight of 2,2'-azobis (isobutyronitrile) were mixed together and introduced into the inside of a test tube having an inside diameter of 12 mm. After the atmosphere of the test tube was replaced by nitrogen, the tube was sealed and the mixture within the test tube was cured under heating at 50° C. for 12 hours and at 60° C. for 6 hours to produce a bar-shaped resin. The bar-shaped resin was sliced into plural buttons each 2 mm in thickness and the sliced surfaces were ground to a mirror finish. Meanwhile, the button-shaped resin could readily be molded into a contact lens by a lathe-cutting method.

On the other hand, 1 wt % of acetic acid was added to an ethanol/water (50/50 (V/V)) solution containing 1 wt % of N-propyl trimethoxysilane-N,N-dimethyl-N-(3-sulfopropyl) ammonium betaine synthesized in Example 1, and the resulting mixture was stirred at room temperature for 30 minutes to produce a surface processing solution for a contact lens.

The resulting surface processing solution was applied to a contact lens prepared from the aforementioned button-shaped resin and air-dried at room temperature for 30 minutes. After heating at 90° C. for one hour, a contact lens having a surface coating layer 50 μm in thickness was produced. The produced contact lens was immersed in distilled water for 24 hours and washed. The contact angle was then measured and found to be 9°, thus indicating satisfactory hydrophilicity. Also, for checking contamination proofing property of the contact lens, the surface-processed contact lens was immersed in a physiological saline containing 0.4 wt % of albumin, 0.2 wt % of lysozyme and 0.1 wt % of globulin and maintained therein at 35° C. for 17 days. After rinsing with the physiological saline, adsorbed protein was peeled off in a 0.5% sodium dodecylsulfonate solution and the protein quantity in the solution was quantitized with BCA Protein Assay Reagent (trade name) manufactured by WAKO PURE CHEMICAL INDUSTRIES, LTD. The results are shown in Table 1.

Example 6

The reaction was carried out in the same way as in Example 5 except using N-propyl trimethoxysilane-N,N-dimethyl-N-(2-carboxyethyl) ammonium betaine synthesized in Example 2 in place of N-propyl trimethoxysilane- N,N-dimethyl-N-(3-sulfopropyl) ammonium betaine to prepare a surface processing solution for a contact lens. Using the produced surface-processing solution, a contact lens was surface-processed in the same way as in Example 5. The contact angle was measured and found to be 10°. The contamination proofing property was measured in the same way as above. The results are shown in Table 1.

Example 7

The reaction was carried out in the same way as in Example 5 except using N-propyl diethoxy methylsilane-N,N-dimethyl-N-(2-sulfopropyl) ammonium betaine synthesized in Example 3 in place of N-propyl trimethoxysilane-N,N-dimethyl-N-(3-sulfopropyl) ammonium betaine to prepare a surface processing solution for a contact lens. Using the produced surface processing solution, a contact lens was surface-processed in the same way as in Example 5. The contact angle was measured and found to be 9°. The contamination proofing property was measured in the same way as above. The results are shown in Table 1.

Example 8

The reaction was carried out in the same way as in Example 5 except using N-propyl diethoxy methylsilane-N,N-dimethyl-N-(2-carboxyethyl) ammonium betaine synthesized in Example 4 in place of N-propyl trimethoxysilane-N,N-dimethyl-N-(3-sulfopropyl) ammonium betaine to prepare a surface processing solution for a contact lens. Using the produced surface processing solution, a contact lens was surface-processed in the same way as in Example 5. The contact angle was measured and found to be 11°. The contamination proofing property was measured in the same way as above. The results are shown in Table 1.

Example 9

N-propyl trimethoxysilane-N,N-dimethyl-N-(3-sulfopropyl) ammonium betaine synthesized in Example 1, was dissolved in ethanol to give a 5 wt % concentration to prepare a surface processing solution for a contact lens.

The resulting surface processing solution was applied to a contact lens prepared from the button-shaped resin similar to that used in Example 5, and was air-dried at room temperature for 30 minutes. After heating at 100° C. in an oven for four hours, a contact lens having a surface coating layer 50 μm in thickness was produced. The produced contact lens was immersed in distilled water for 24 hours and washed. The contact angle was then measured and found to be 12°, thus indicating satisfactory hydrophilicity. The contamination proofing property was also measured in the same way as in Example 5. The results are shown in Table 1.

Comparative Example 1

In Example 5, a contact lens was prepared from the button-shaped resin and the contact angle of the contact lens was measured without surface-processing the contact lens and found to be 86°. The contamination proofing property was also measured in the same way as in Example 5. The results are shown in Table 1.

TABLE 1

| | Quantity of protein (μg/cm²) |
|---|---|
| Ex. 5 | 2.3 |
| Ex. 6 | 2.8 |
| Ex. 7 | 3.1 |

TABLE 1-continued

| | Quantity of protein (μg/cm²) |
|---|---|
| Ex. 8 | 3.3 |
| Ex. 9 | 3.3 |
| Comp.Ex. 1 | 5.9 |

What is claimed is:

1. A contact lens comprising a substrate of a contact lens resin and a layer of a surface coating material on said substrate, said contact lens resin having a functional group capable of being condensed with at least one of a silanol group or an alkoxysilane group, said surface coating material containing at least one of
   (i) an alkoxysilane compound represented by the formula (I):

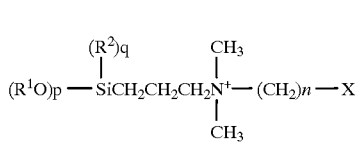

wherein $R^1$ and $R^2$ stand for a methyl group or an ethyl group, X is —COO⁻ or —SO₃⁻, p is an integer of 2 or 3, n is an integer of 1 to 3 and q is 0 or 1, where p+q=3, or
   (ii) an acid-processed reaction product thereof, said layer being fixed on the substrate by silane coupling reaction.

2. The contact lens as claimed in claim 1, wherein said alkoxysilane compound is selected from the group consisting of N-propyl trimethoxysilane-N,N-dimethyl-N-(3-sulfopropyl) ammonium betaine, N-propyl trimethoxysilane-N,N-dimethyl-N-(2-carboxyethyl) ammonium betaine, N-propyl diethoxy methylsilane-N,N-dimethyl-N-(3-sulfopropyl) ammonium betaine, N-propyl diethoxy methylsilane-N,N-dimethyl-N-(2-carboxyethyl) ammonium betaine, N-propyl trimethoxysilane-N,N-dimethyl-N-(1-sulfomethyl) ammonium betaine, N-propyl diethoxy methylsilane-N,N-dimethyl-N-(1-sulfomethyl) ammonium betaine, N-propyl dimethoxy methylsilane-N,N-dimethyl-N-(2-sulfoethyl) ammonium betaine, N-propyl diethoxy methylsilane-N,N-dimethyl-N-(2-sulfoethyl) ammonium betaine, and N-propyl diethoxy methylsilane-N,N-dimethyl-N-(carboxymethyl) ammonium betaine.

3. The contact lens as claimed in claim 1, wherein said acid-processed reaction product is selected from the group consisting of a compound corresponding to the alkoxysilane compound, at least a part of the alkoxysilane groups of which is converted to a silanol group, a condensation product of said compound corresponding to the alkoxysilane compound, at least a part of the alkoxysilane groups of which is converted to a silanol group, and mixtures thereof.

4. The contact lens as claimed in claim 1, wherein said acid-processed reaction product has been prepared by adding and mixing an acid selected from the group consisting of acetic acid, hydrochloric acid, sulfuric acid, and mixtures thereof to said alkoxysilane compound.

5. The contact lens as claimed in claim 1, wherein said layer has a thickness of 0.001 to 1000 μm.

6. The contact lens as claimed in claim 1, wherein a contact angle of the contact lens measured after the contact lens was immersed in distilled water for 24 hours and washed is not more than 12°.

7. The contact lens as claimed in claim 1, wherein the contact lens is selected from the group consisting of an oxygen permeable hard contact lens and a soft contact lens.

* * * * *